United States Patent [19] [11] Patent Number: 4,762,027
Fagiolini et al. [45] Date of Patent: Aug. 9, 1988

[54] ROTATING GRINDING WHEEL DEVICE FOR SHARPENING CHAIN SAWS

[75] Inventors: Floriano Fagiolini, Cannobio; Gianfranco Storti, Omegna, both of Italy

[73] Assignee: Fercad S.P.A., Vincenza, Italy

[21] Appl. No.: 899,217

[22] PCT Filed: Dec. 4, 1985

[86] PCT No.: PCT/IT85/00049
§ 371 Date: Oct. 8, 1986
§ 102(e) Date: Oct. 8, 1986

[87] PCT Pub. No.: WO86/03702
PCT Pub. Date: Jul. 3, 1986

[30] Foreign Application Priority Data
Dec. 19, 1984 [IT] Italy .................. 85670 A/84

[51] Int. Cl.$^4$ ............................................. B23D 63/16
[52] U.S. Cl. ......................................... 76/25 A; 76/40
[58] Field of Search ...................... 76/25 A, 40, 37

[56] References Cited
U.S. PATENT DOCUMENTS
4,319,502 3/1982 Smith ........................... 76/40

FOREIGN PATENT DOCUMENTS
2828496 1/1980 Fed. Rep. of Germany .
3246079 6/1984 Fed. Rep. of Germany .
3422686 12/1985 Fed. Rep. of Germany ..... 76/25 A Primary Examiner—Roscoe V. Parker
Attorney, Agent, or Firm—Bucknam and Archer

[57] ABSTRACT

The device is mounted on a support plate (3) by means of vice (1) formed by gripping jaws (23). The rotating grinding wheel (6) driven by its motor is carried by an arm swivelling on a pivot (5) and may be displaced longitudinally, as well as vertically and may be displaced angularly in both directions with respect to the chain (4) to be sharpened. The sharpening of the chain's teeth (7) is effected by the grinding wheel (6) after locking the chain with the vice (1). In this manner the teeth of the chain may be sharpened without removing the chain from the saw.

3 Claims, 4 Drawing Sheets

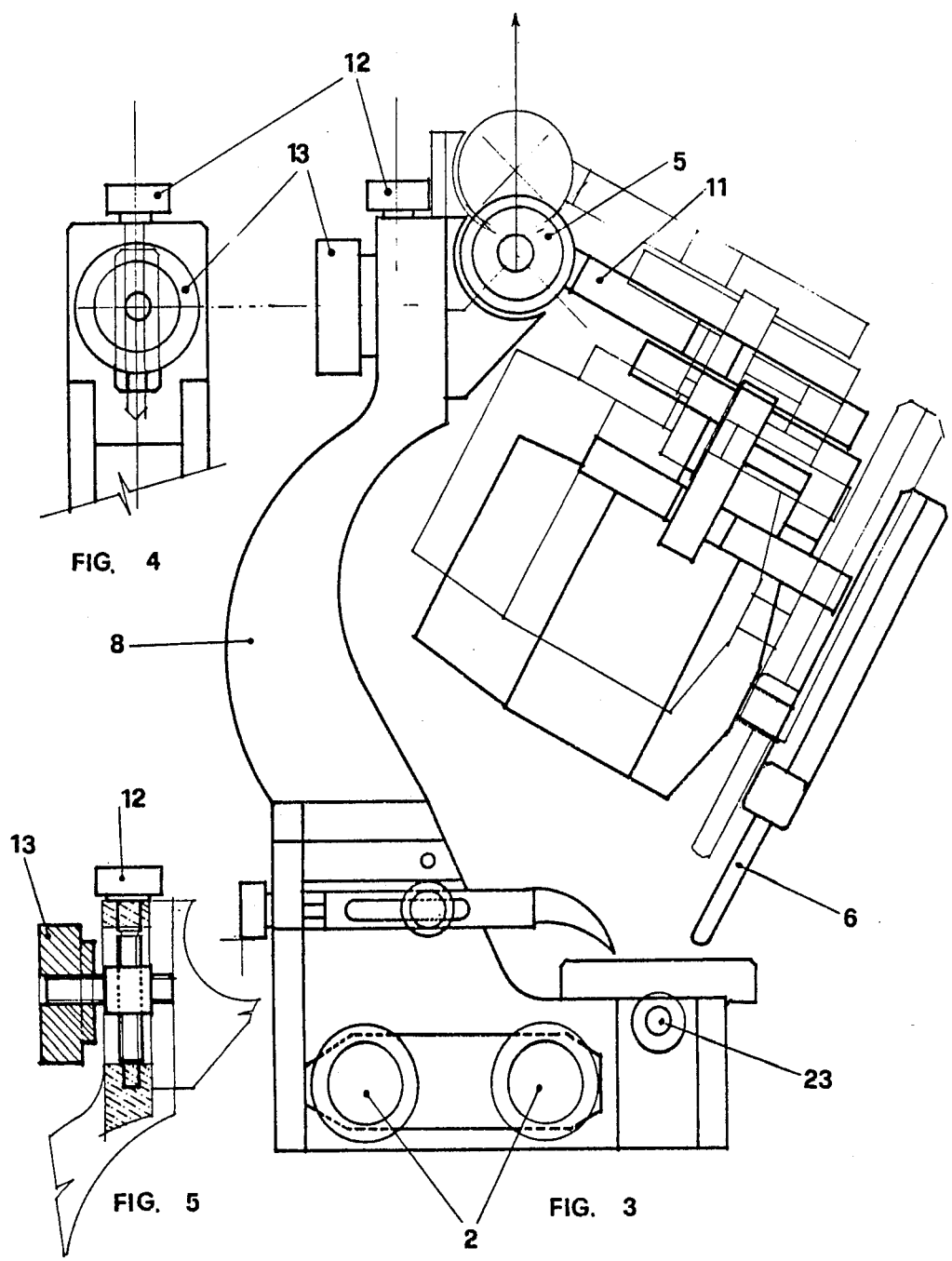

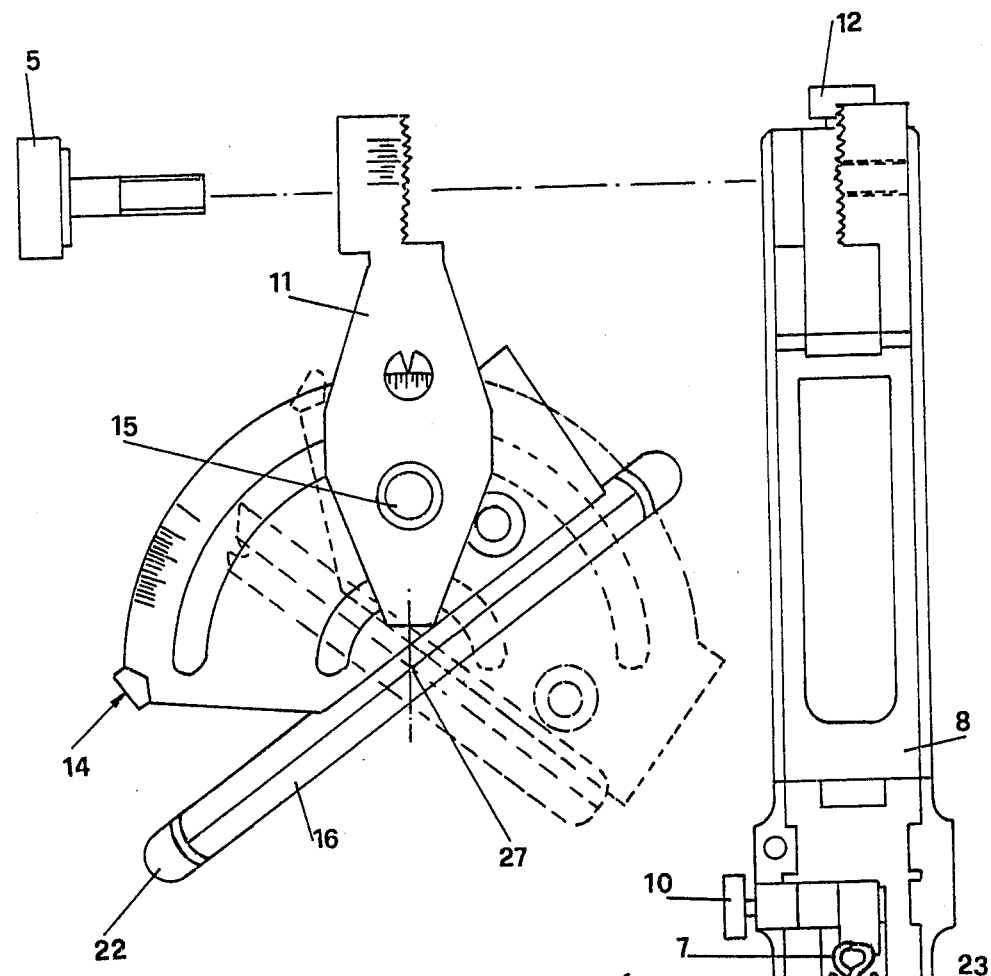
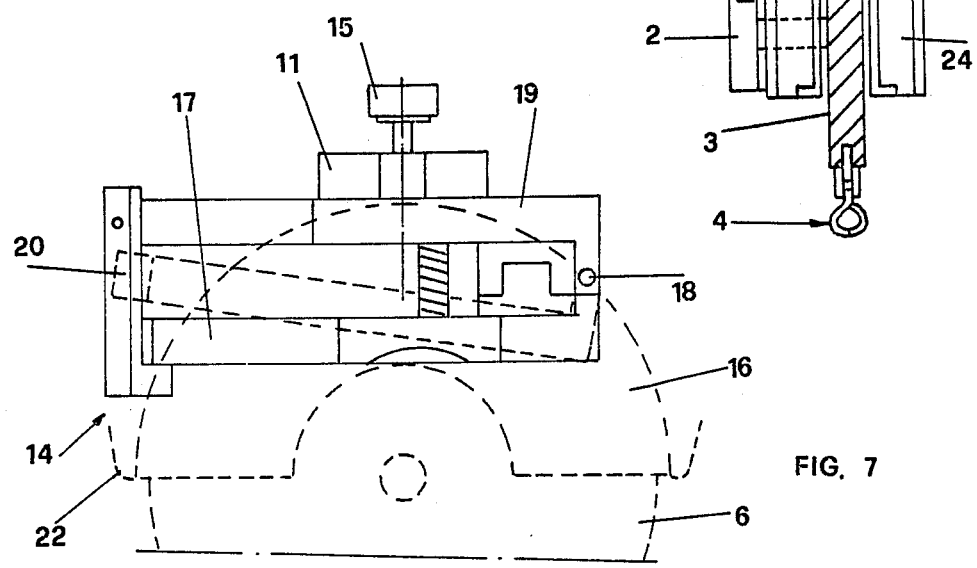
FIG. 6
FIG. 7

ROTATING GRINDING WHEEL DEVICE FOR SHARPENING CHAIN SAWS

The present invention relates to an apparatus for sharpening the teeth of a saw and more specifically for sharpening the teeth of a saw which has a continuous chain of a portable saw, by means of a rotating, grinding wheel, for cutting tree trunks without removing the chain of the apparatus.

It is well known that in this type of operation, portable saws with motors are used, which saws have a shaped metallic blade emerging from the body of the saw. The saw is provided with grip handles, a panel, a chain sliding along the borders of the panel, the chain being provided with shaped teeth, which teeth carry out the cutting operation. However, the teeth frequently must be sharpened with an operation which up to the present time has been carried out by hand with special devices and with substantial difficulty. Occasionally bench sharpening devices are used which require dismounting of the chain from the saw.

The crux of the present invention resides in providing a machine which permits the sharpening operation of each tooth on the chain while the chain is being held by a gripping vice, which vice is located in the base of the saw. A grinding rotating wheel is located on the movable arm of the machine. The grinding wheel is controlled by its own electric motor so that it is possible to sharpen the teeth of the chain with very high regularity and accuracy.

The machine comprises a movable arm pivoted to the upper apex of a column emerging from the base of the machine. The arm carries the rotating, grinding wheel with its own electric motor, while on the base of the machine is located a guiding vice which grips the blade and the chain the teeth of which must be sharpened.

A suitable movable tooth fixed in a position which is adjustable is located on the base of the machine and supports the chain in a fixed position during the sharpening operation.

The rotation grinding wheel with its own control motor is capable of positions which may be regulated in depth as well as in height because the arm which carries the rotating grinding wheel is capable of rotating angularly according to an angle of about 40° in every direction so that it is possible to sharpen alternately a series of teeth according to opposite angulations as it is required in the case of saws for a chain for tree trunks.

The invention is further illustrated by the drawings of which:

FIG. 3 illustrates schematically a side view of the saw with two positions of the grinding wheel with a different height;

FIG. 4 illustrates a rear view of the upper part of the saw;

FIG. 5 illustrates a side view of the same upper part of the saw partially in cross section FIG. 6 illustrates a front view of the saw showing the component elements;

FIG. 7 is a front view of the portion of the apparatus which varies the orientation of the grinding wheel.

Figure 1:
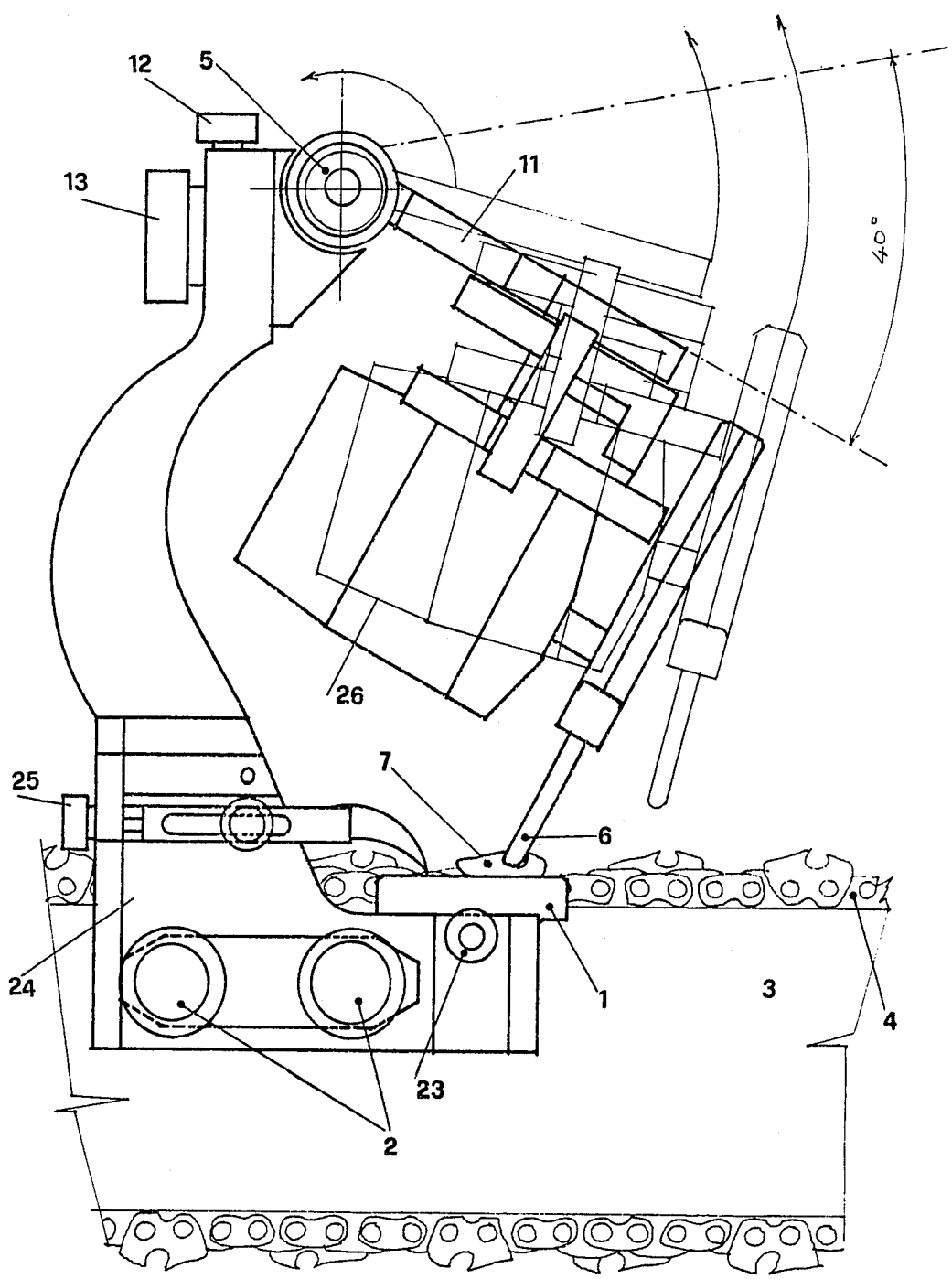
FIG. 1 illustrates a side view of the saw mounted on a panel which carries the chain to be sharpened with a tooth of the chain under the action of the grinding wheel.

As shown in FIG. 1 the apparatus comprises base 24 and vice 1 which consists of two jaws controlled by means of screws 23. The vice grips the chain to be sharpened while the screws 2 may be regulated to grip the support blade 3 which supports chain 4. The apparatus comprises a vertical column 8 on which is mounted pin 5 which carries the entire complex of the grinding rotating wheel 6 having center 27 provided with its own electrical motor 26, which grinding wheel provides for sharpening the teeth 7 of chain 4 according to a manner of operation which will be better described hereinbelow.

Figure 2:
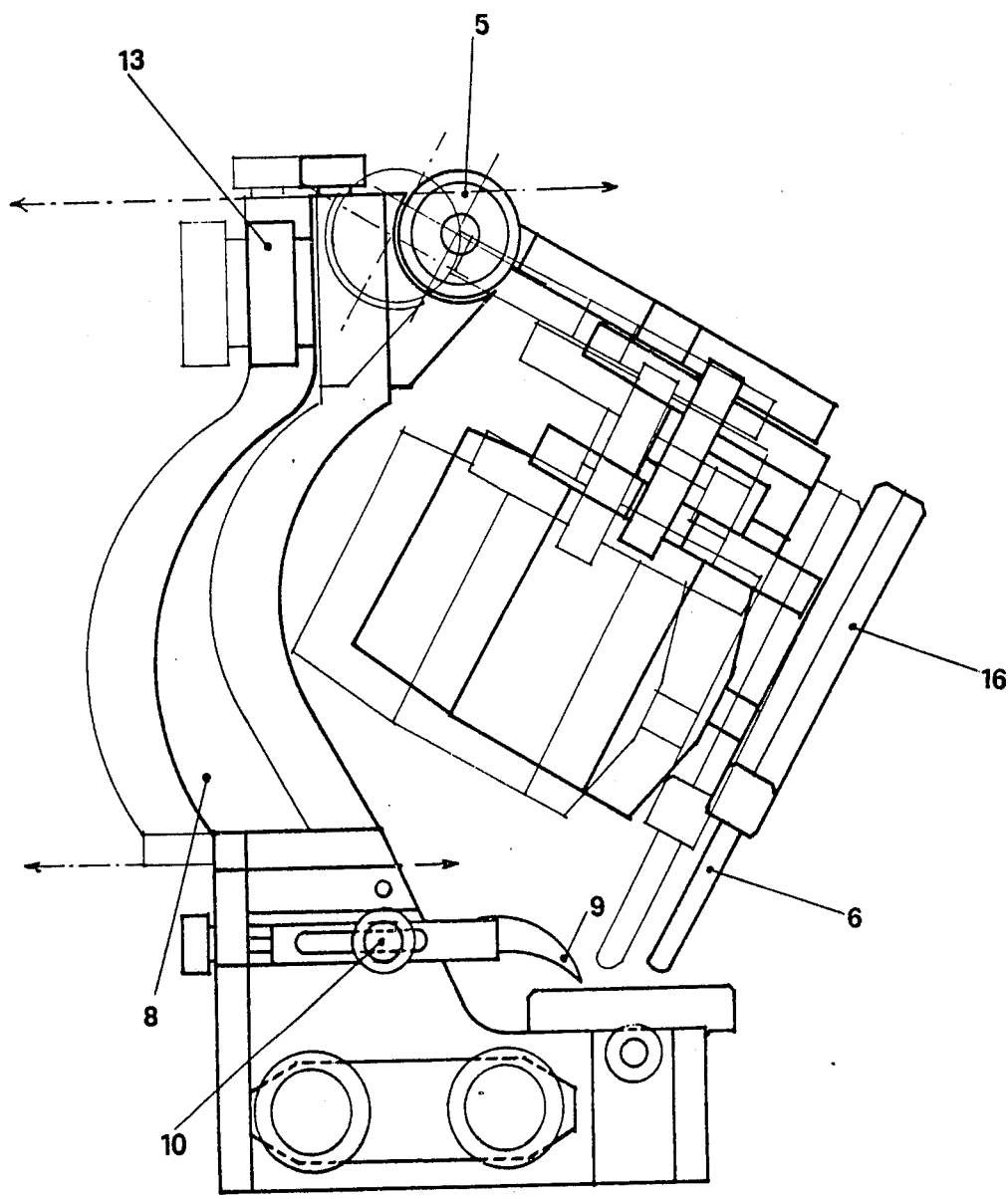
FIG. 2 illustrates schematically a side view of the saw with two positions of the grinding wheel with a different depth.

As shown in FIG. 2, one of the displacements which may be carried out by the grinding wheel 6 consists of a displacement in the longitudinal direction with respect to the axis of the chain, as shown in the figure with a thin line and with a thick line of the grinding wheel 6 and related supporting means. It is also noted that the entire column 8 which supports by means of pin 5 the complex of motor and grinding wheel is horizontally movable along guides as shown by the direction of the arrows in FIG. 2, a fact which permits the displacement of the grinding wheel 6 in the longitudinal direction. It should also be noted that during the sharpening operation, the movable element 9, which has a drooping shape, holds the element of the chain being worked by means of its tip. The position of the element 9 with respect to the base of the apparatus is adjustable by means of a vice with screws which may be locked by means of the handwheel 10. The latter acts on an oblong opening present in the bar which supports element 9.

The displacement in the longitudinal direction of the rotating grinding wheel 6 serves the purpose of utilizing the same grinding wheel for sharpening the disks of the saw provided with curved teeth intended to cut roots because it permits to increase the angle of inclination of the plane of the grinding wheel with respect to the longitudinal axis of the disk in order to achieve a greater inclination of the teeth of the same disk.

A second displacement to which the complex motor-grinding wheel may be subjected consists of the raising motion shown in FIG. 3 which shows that the complex pin 5-arm 11 is movable in height with respect to the column 8 of the apparatus because pin 5 is mounted on a slide which is vertically movable with respect to the guides provided in the column 8.

The position of the complex in height is regulated by means of the regulating screw 12 and is fixed by the locking vice controlled by the hand-grip 13.

In this manner it is possible to regulate the depth of sharpening which may be changed according to the model of the chain being sharpened.

FIG. 6 shows the position which allows a rotation of the rotating wheel 6 with its related and corresponding control motor by means of sector 14 provided with a corresponding opening shaped as an arc of a circular sector and an angular graduation readable through an opening on the board.

This angle may be varied for instance between 0° and 40° with an approximation of 1° because its angular position is fixed by means of a vice 15.

It is well known that the teeth of the chain are sharpened ordinarily according to the planes of inclination which are alternately in opposite directions according to angles which vary according to particular requirements.

Obviously it is advantageous to provide for sharpening of all the teeth of the continuous chain which are oriented in one direction and then provide for sharpening of the teeth oriented in the opposite direction, and according to the opposite direction of rotation of the grinding wheels.

FIG. 7 is a front view of the grinding wheel with its related movable support. It is sufficient that the grinding wheel 6 with its related protection case 16 be integral with the plate 17 movable on pin 18, the latter being integral with the fixed plate 19. For this purpose, bracket 20 is provided which determines the angular limit of displacement of the plate 17 with a return spring which causes the return of plate 17 to the rest position shown in dotted lines in FIG. 7.

The motion of lowering of the grinding wheel 6 is controlled by the fingers of the operator's hand together with the hook 22 which is integral with the case. This motion is obviously carried out after having positioned the grinding wheel in the proper orientation and desired depth according to the sharpening operation being carried out.

Obviously the apparatus of the present invention has been described and illustrated in the accompanying drawings in a particular embodiment which has been shown by way of illustration but several modifications may be carried out without changing the essential features of the invention.

What is claimed is:

1. An apparatus for sharpening the teeth of a chain (4) in a portable saw having a chain with teeth for cutting tree trunks and the like, the chain sliding on a guiding blade (3), which comprises a base (24), a column (8) supported thereon, a movable arm (11) supported by said column, a complex of a grinding wheel (6) and electric motor (26) supported on said movable arm and being mounted on a graduated circular sector (19), said graduated circular sector being provided with locking means (15), said circulate sector (19) being connected to a support plate (17) movable on pin (18), said grinding wheel and said electric motor being carried by said support plate (17), said support plate (17) being angularly movable, and the apparatus comprises bracket means (20) for limiting said angular motion of said support plate, and resilient means for urging said support plate to an inoperative position whereby the teeth of the chain may be slid on said blade so that they may be sharpened according to alternately opposite angles without dismounting said guiding blade therefrom.

2. The apparatus according to claim 1 wherein said support plate (17) rotates on pin (18), the center (27) of said grinding wheel coincides with the plane of said guiding blade (3).

3. The apparatus according to claim 1 which comprises a vice (1) having two jaws for gripping said chain (4) and screws (23) for controlling said jaws and screws (2) for connecting said guiding blade thereto.

* * * * *